(12) United States Patent
Nam (10) Patent No.: US 10,949,380 B2
(45) Date of Patent: Mar. 16, 2021

(54) MXN SYSTOLIC ARRAY AND PROCESSING SYSTEM THAT INPUTS WEIGHTS TO ROWS OR COLUMNS BASED ON MODE TO INCREASE UTILIZATION OF PROCESSING ELEMENTS (71) Applicant: SK hynix Inc., Icheon (KR)

(72) Inventor: Ji-Hoon Nam, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 16/684,246

(22) Filed: Nov. 14, 2019

(65) Prior Publication Data
US 2020/0285605 A1 Sep. 10, 2020

(30) Foreign Application Priority Data
Mar. 7, 2019 (KR) .................. 10-2019-0026198

(51) Int. Cl.
G06F 15/80 (2006.01)
G06F 9/30 (2018.01)

(52) U.S. Cl.
CPC ........ G06F 15/8046 (2013.01); G06F 9/3001 (2013.01); G06F 9/30189 (2013.01)

(58) Field of Classification Search
CPC .. G06F 15/8046; G06F 9/30189; G06F 17/16; G06F 7/78; G06F 9/3001
USPC ......................................................... 712/19
See application file for complete search history.

(56) References Cited

U.S. PATENT DOCUMENTS

| | | | | |
|---|---|---|---|---|
| 5,317,755 A | * | 5/1994 | Hartley | G06F 15/8046 341/101 |
| 5,719,642 A | * | 2/1998 | Lee | H04N 19/433 348/699 |
| 9,047,241 B2 | | 6/2015 | Mazahreh et al. | |
| 9,805,304 B2 | * | 10/2017 | Ross | G06F 15/8046 |
| 10,445,638 B1 | * | 10/2019 | Amirineni | G06F 17/16 |
| 10,831,702 B2 | * | 11/2020 | Yaakov et al. | G06F 9/30032 |
| 2008/0133879 A1 | * | 6/2008 | Yang | G06F 9/3885 712/11 |
| 2010/0131738 A1 | * | 5/2010 | Kobori | G06F 15/17381 712/19 |
| 2018/0267936 A1 | * | 9/2018 | Chen | G06F 17/16 |
| 2018/0336163 A1 | * | 11/2018 | Phelps | G06F 9/30032 |
| 2019/0012295 A1 | * | 1/2019 | Yinger | G06F 7/5443 |
| 2019/0236049 A1 | * | 8/2019 | Vantrease | G06N 3/063 |
| 2020/0192701 A1 | * | 6/2020 | Horowitz | G06N 3/08 |

OTHER PUBLICATIONS

Bosheng Liu, Addressing the issue of processing element under-utilization in general-purpose systolic deep learning accelerators. In Proceedings of the 24th Asia and South Pacific Design Automation Conference (ASPDAC '19); 6 pages (Year: 2019).*

* cited by examiner

*Primary Examiner* — Keith E Vicary (57) ABSTRACT

A processing system may include a systolic array including a plurality of processing elements (PEs) arrayed in M rows and N columns, where M and N are natural numbers and M is not equal to N. The processing system may further include a row buffer configured to transmit row data to the systolic array in a row direction, and a column buffer configured to transmit column data to the systolic array in a column direction. When the processing system is in a first mode, the row data is input data and the columns data is weights. When the processing system is in a second mode the row data is the weights and the column data is the input data.

13 Claims, 9 Drawing Sheets

B1:
$$\begin{bmatrix} I_{1,1}W_{1,1}+I_{1,2}W_{2,1}+I_{1,3}W_{3,1} & I_{1,1}W_{1,2}+I_{1,2}W_{2,2}+I_{1,3}W_{3,2} \\ I_{2,1}W_{1,1}+I_{2,2}W_{2,1}+I_{2,3}W_{3,1} & I_{2,1}W_{1,2}+I_{2,2}W_{2,2}+I_{2,3}W_{3,2} \\ I_{3,1}W_{1,1}+I_{3,2}W_{2,1}+I_{3,3}W_{3,1} & I_{3,1}W_{1,2}+I_{3,2}W_{2,2}+I_{3,3}W_{3,2} \\ I_{4,1}W_{1,1}+I_{4,2}W_{2,1}+I_{4,3}W_{3,1} & I_{4,1}W_{1,2}+I_{4,2}W_{2,2}+I_{4,3}W_{3,2} \end{bmatrix}$$

B2:
$$\begin{bmatrix} I_{1,1}W_{1,3}+I_{1,2}W_{2,3}+I_{1,3}W_{3,3} & I_{1,1}W_{1,4}+I_{1,2}W_{2,4}+I_{1,3}W_{3,4} \\ I_{2,1}W_{1,3}+I_{2,2}W_{2,3}+I_{2,3}W_{3,3} & I_{2,1}W_{1,4}+I_{2,2}W_{2,4}+I_{2,3}W_{3,4} \\ I_{3,1}W_{1,3}+I_{3,2}W_{2,3}+I_{3,3}W_{3,3} & I_{3,1}W_{1,4}+I_{3,2}W_{2,4}+I_{3,3}W_{3,4} \\ I_{4,1}W_{1,3}+I_{4,2}W_{2,3}+I_{4,3}W_{3,3} & I_{4,1}W_{1,4}+I_{4,2}W_{2,4}+I_{4,3}W_{3,4} \end{bmatrix}$$

$$\begin{bmatrix} I_{1,1}W_{1,1}+I_{1,2}W_{2,1}+I_{1,3}W_{3,1} & I_{1,1}W_{1,2}+I_{1,2}W_{2,2}+I_{1,3}W_{3,2} \\ I_{2,1}W_{1,1}+I_{2,2}W_{2,1}+I_{2,3}W_{3,1} & I_{2,1}W_{1,2}+I_{2,2}W_{2,2}+I_{2,3}W_{3,2} \end{bmatrix}_{B1} \begin{bmatrix} I_{1,1}W_{1,3}+I_{1,2}W_{2,3}+I_{1,3}W_{3,3} & I_{1,1}W_{1,4}+I_{1,2}W_{2,4}+I_{1,3}W_{3,4} \\ I_{2,1}W_{1,3}+I_{2,2}W_{2,3}+I_{2,3}W_{3,3} & I_{2,1}W_{1,4}+I_{2,2}W_{2,4}+I_{2,3}W_{3,4} \end{bmatrix}_{B2}$$

$$\begin{bmatrix} I_{1,1}W_{1,1}+I_{1,2}W_{2,1}+I_{1,3}W_{3,1} & I_{2,1}W_{1,1}+I_{2,2}W_{2,1}+I_{2,3}W_{3,1} \\ I_{1,1}W_{1,2}+I_{1,2}W_{2,2}+I_{1,3}W_{3,2} & I_{2,1}W_{1,2}+I_{2,2}W_{2,2}+I_{2,3}W_{3,2} \\ I_{1,1}W_{1,3}+I_{1,2}W_{2,3}+I_{1,3}W_{3,3} & I_{2,1}W_{1,3}+I_{2,2}W_{2,3}+I_{2,3}W_{3,3} \\ I_{1,1}W_{1,4}+I_{1,2}W_{2,4}+I_{1,3}W_{3,4} & I_{2,1}W_{1,4}+I_{2,2}W_{2,4}+I_{2,3}W_{3,4} \end{bmatrix}$$

FIG. 11

$$\begin{bmatrix} I_{1,1}W_{1,1}+I_{1,2}W_{2,1}+I_{1,3}W_{3,1} & I_{1,1}W_{1,2}+I_{1,2}W_{2,2}+I_{1,3}W_{3,2} & I_{1,1}W_{1,3}+I_{1,2}W_{2,3}+I_{1,3}W_{3,3} & I_{1,1}W_{1,4}+I_{1,2}W_{2,4}+I_{1,3}W_{3,4} \\ I_{2,1}W_{1,1}+I_{2,2}W_{2,1}+I_{2,3}W_{3,1} & I_{2,1}W_{1,2}+I_{2,2}W_{2,2}+I_{2,3}W_{3,2} & I_{2,1}W_{1,3}+I_{2,2}W_{2,3}+I_{2,3}W_{3,3} & I_{2,1}W_{1,4}+I_{2,2}W_{2,4}+I_{2,3}W_{3,4} \end{bmatrix}$$

MXN SYSTOLIC ARRAY AND PROCESSING SYSTEM THAT INPUTS WEIGHTS TO ROWS OR COLUMNS BASED ON MODE TO INCREASE UTILIZATION OF PROCESSING ELEMENTS

CROSS-REFERENCE TO RELATED APPLICATION

This application claims priority under 35 U.S.C. § 119 to Korean Patent Application No. 10-2019-0026198 filed on Mar. 7, 2019, which is incorporated herein by reference in its entirety.

BACKGROUND

1. Field

Exemplary embodiments relate to a systolic array and a processing system including the same.

2. Discussion of the Related Art

A convolution neural network (CNN) is a processing system often used for image recognition and analysis. Such a processing system performs a convolution operation to, for example, extract a feature from an image through the application of a specific filter. A systolic array may be used for such an operation.

The systolic array includes a plurality of processing elements (PEs) arranged in a plurality of rows and a plurality of columns. The utilization of the systolic array may be low because only some of the plurality of PEs may be used in many cases.

SUMMARY

Various embodiments are directed to the provision of a technique for increasing the utilization of a systolic array.

In an embodiment, a processing system may include a systolic array comprising a plurality of processing elements (PEs) arrayed in M rows and N columns, wherein M and N are natural numbers and M is not equal to N; a row buffer configured to transmit row data to the systolic array in a row direction, wherein the row data is input data when the processing system is in a first mode and the row data is weights when the processing system is in a second mode; and a column buffer configured to transmit column data to the systolic array in a column direction, wherein the column data is the weights when the processing system is in the first mode and the column data is the input data when the processing system is in the second mode.

In an embodiment, a systolic array may include M row inputs configured to transmit input data as row data in a first mode and to transmit weights as the row data in a second mode, wherein M is a natural number; N column inputs configured to transmit the weights as column data in the first mode and to transmit the input data as column data in the second mode, wherein N is a natural number and N is not equal to M; and M*N processing elements (PEs) each configured to perform a multiplication operation on row data transmitted to a row input corresponding to the PE among the M row inputs and column data transmitted to a column input corresponding to the PE among the N column inputs, and to sum a result of the multiplication operation and a result of a previous operation.

DETAILED DESCRIPTION

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 1:
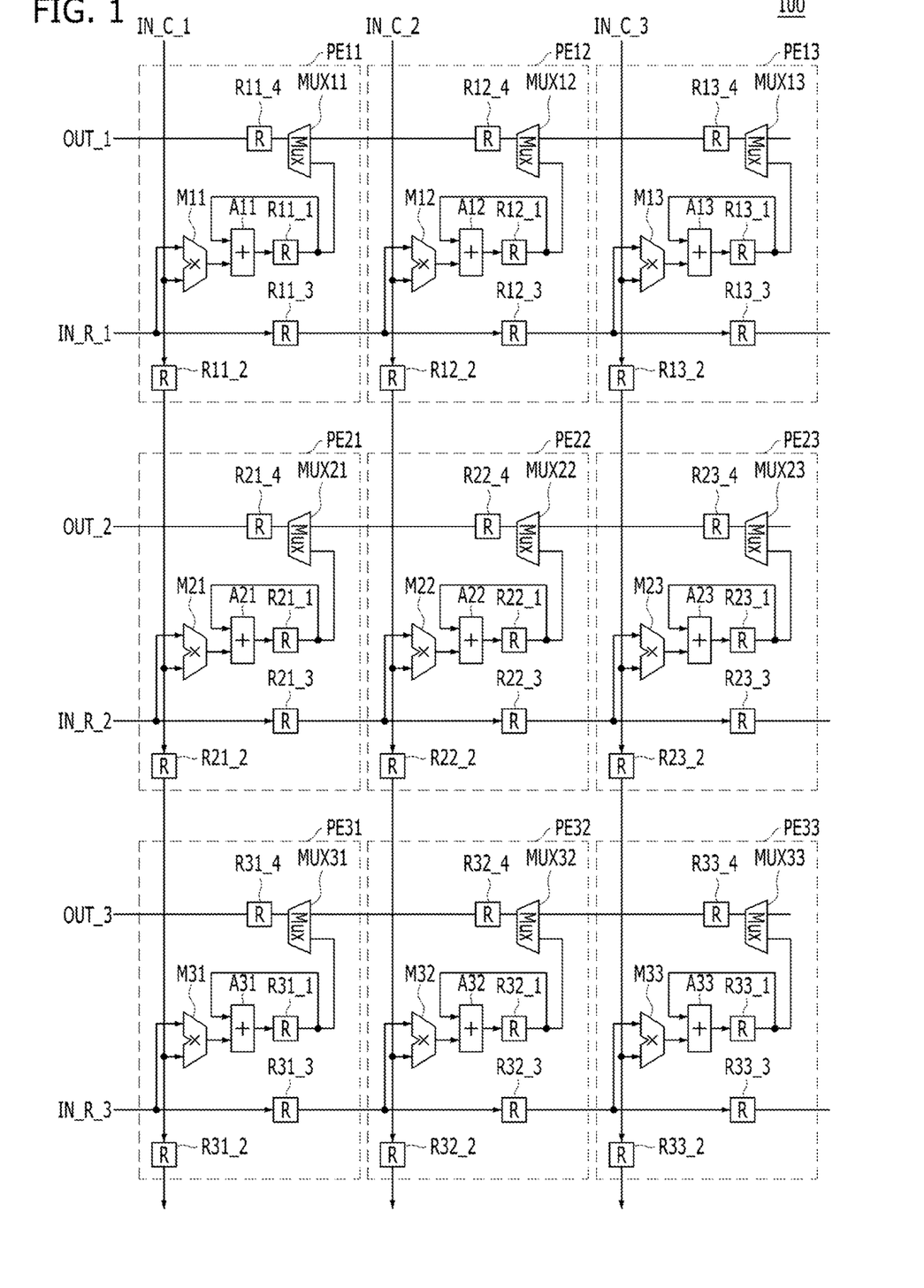
FIG. 1 illustrates a systolic array according to an embodiment.

FIG. 1 is a diagram illustrating a systolic array 100 according to an embodiment.

The systolic array 100 may include a plurality of row inputs IN_R_1, IN_R_2, and IN_R_3, a plurality of column inputs IN_C_1, IN_C_2, and IN_C_3, a plurality of outputs OUT_1, OUT_2, and OUT_3 and a plurality of processing elements (PEs) PE11 to PE33 (i.e., PE11, PE12, PE13, PE21, PE22, PE23, PE31, PE32 and PE33).

The plurality of row inputs IN_R_1 to IN_R_3 may transmit input data to the PEs PE11 to PE33. The row inputs IN_R_1 to IN_R_3 may each transmit input data to the PEs PE11 to PE33 of rows corresponding to themselves. For example, the row input IN_R_2 may transmit input data to the PEs P21, P22, and P23. The input data may be image data, for example.

The plurality of column inputs IN_C_1 to IN_C_3 may transmit weights to the PEs PE11 to PE33. The column inputs IN_C_1 to IN_C_3 may each transmit weights to the PEs PE11 to PE33 of columns corresponding to themselves.

For example, the column input IN_C_3 may transmit a weight to the PEs PE13, PE23, and PE33.

The plurality of outputs OUT__1 to OUT__3 is arrayed in the same direction as the row inputs IN_R_1 to IN_R_3, and may use operation results of the PEs PE11 to PE33 for outputs. The outputs OUT__1 to OUT__3 may each output operation results of the PEs PE11 to PE33 of rows corresponding to themselves. For example, the output OUT__1 may output operation results of any of the PEs PE11, PE12, and PE13.

The plurality of PEs PE11 to PE33 may perform a multiplication operation on input data transmitted to row inputs corresponding to themselves among the row inputs IN_R_1 to IN_R_3 and weights transmitted to column inputs corresponding to themselves among the column inputs IN_C_1 to IN_C_3, and may sum the results of the multiplication operation with previous operation results. For example, the PE PE23 may multiply input data input to the row input IN_R_2 and a weight input to the column input IN_C_3, and may sum the results of the multiplication with a previous operation result.

The structure of the PE will be described by taking the PE PE12 of the plurality of PEs PE11 to PE33 as an example. The PE PE12 may include a multiplier M12, an adder A12, first to fourth registers R12_1, R12_2, R12_3, and R12_4 and a multiplexer MUX12. The multiplier M12 may perform a multiplication operation on input data provided via the row input IN_R_1 and a weight provided via the column input IN_C_2. The adder A12 may perform an addition operation on the results of the multiplication of the multiplier M12 and a value stored in the first register R12_1, and may store the results of the addition operation in the first register R12_1. The third register R12_3 may be a register for transmitting the input data, received from the row input IN_R_1 through the PE PE11 of a previous column, to the PE PE13 of a next column. The second register R12_2 may be an register for transmitting the weight, received from the column input IN_C_2, to the PE PE22 of a next row. The multiplexer MUX12 may select one of operation results from another PE, transmitted from the PE PE13 of the next column, and the operation results stored in the first register R12_1. The fourth register R12_4 may store an output value of the multiplexer MUX12 and transmit the output value to the PE PE11 of the previous column. The other PEs PE11, PE13, PE21, PE22, PE23, PE31, PE32, and PE33 include respective multipliers M11, M13, M21, M22, M23, M31, M32, and M33; respective adders A11, A13, A21, A22, A23, A31, A32, and A33; respective first registers R11_1, R13_1, R21_1, R22_1, R23_1, R31_1, R32_1 and R33_1; respective second registers R11_2, R13_2, R21_2, R22_2, R23_2, R31_2, R32_2 and R33_2; respective third registers R11_3, R13_3, R21_3, R22_3, R23_3, R31_3, R32_3 and R33_3; respective fourth registers R11_4, R13_4, R21_4, R22_4, R23_4, R31_4, R32_4 and R33_4; and respective multiplexers MUX11, MUX13, MUX21, MUX22, MUX23, MUX31, MUX32, and MUX33; each of which operates in the manner described for the corresponding element of PE PE12.

Figure 2:
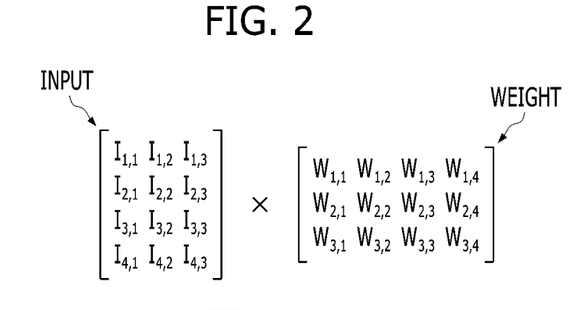
FIG. 2 shows an illustrative matrix multiplication operation that may be performed using a systolic array.

An example will be described in which a matrix multiplication operation for multiplying a 4×3 input data matrix INPUT and a 3×4 weight matrix WEIGHT, such as shown in FIG. 2, is performed. FIG. 2 illustrates that the input data matrix INPUT is configured with four batches. In this case, the batch may mean the number of data. For example, in the input data matrix INPUT of FIG. 2, a batch may be an image of each of four rows. That is, the input data matrix may include four images (batches) $(I_{11}, I_{12}, I_{13})$, $(I_{21}, I_{22}, I_{23})$, $(I_{31}, I_{32}, I_{33})$, and $(I_{41}, I_{42}, I_{43})$.

Figure 3:
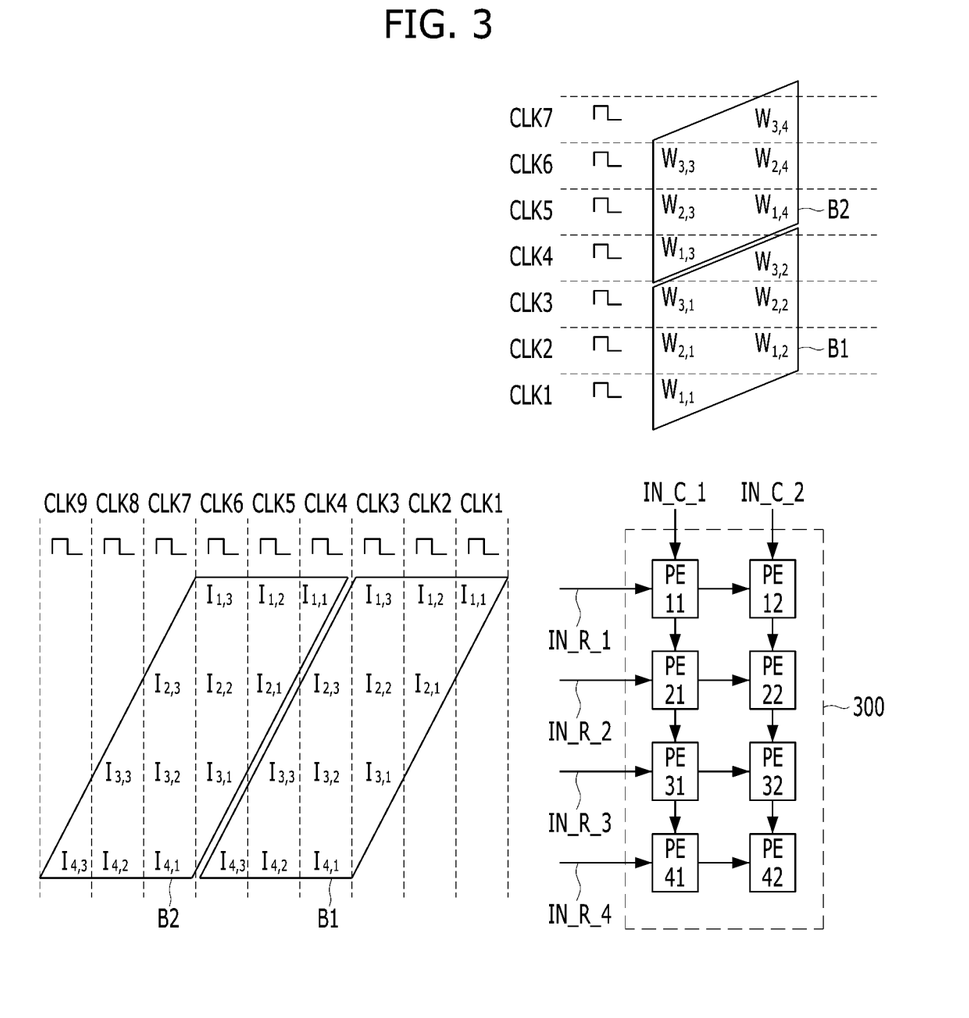
FIG. 3 illustrates how an input data matrix and a weight matrix may be input to a systolic array to perform the matrix multiplication operation of FIG. 2 using a 4×2 systolic array.

FIG. 3 is a diagram illustrating how an input data matrix INPUT and a weight matrix WEIGHT may be input to the row inputs IN_R_1 to IN_R_4 and column inputs IN_C_1 and IN_C_2 of a 4×2 systolic array 300 to perform the matrix multiplication operation of FIG. 2.

In FIG. 3, CLK1 may indicate values input to the systolic array 300 in a first cycle, CLK2 may indicate values input to the systolic array 300 in a second cycle, and so on. For example, in the first cycle CLK1, $I_{11}$ and $W_{11}$ may be input to the PE PE11 and a corresponding result (such as the product of $I_{11}$ and $W_{11}$) calculated. In the second cycle CLK2, $I_{12}$ and $W_{12}$ may be input to the PE PE11 and a corresponding result (such as the product of $I_{12}$ and $W_{21}$ summed with the result of the calculation $I_{11} \cdot W_{11}$ performed by the PE PE11 in the first cycle CLK1) calculated, $I_{11}$ and $W_{12}$ may be input to the PE PE12 and a corresponding result (such as the product of $I_{11}$ and $W_{12}$) calculated, and $I_{21}$ and $W_{11}$ may be input to the PE PE21 and a corresponding result (such as the product of $I_{21}$ and $W_{11}$) calculated. That is, the PE PE12 may receive the input data $I_{11}$, received by the PE PE11 of a previous column in the first cycle CLK1, in the second cycle CLK2. The PE PE21 may receive the weight $W_{11}$, received by the PE PE11 of a previous row in the first cycle CLK1, in the second cycle CLK2.

In FIG. 3, a boundary B1 or B2 may indicate the range of operation. The PEs PE11, PE12, PE21, PE22, PE31, PE32, PE41, and PE42 of the systolic array 300 may add multiplication values of input data and weights in the boundary unit B1 or B2, and may output the results of the addition. The results may be stored in the fourth registers Rxx_4 of the PEs as each boundary unit is completed by that PE (i.e., after the third cycle for PE11, after the fourth cycle for PE12 and PE21, and so on), and then output while the next boundary unit is processed. If operation results are output from the systolic array 300 in the boundary unit B1 or B2 of FIG. 3, result values, such as FIG. 4, may be derived. It can be seen that FIG. 4 illustrates the matrix multiplication results of the input data matrix INPUT and weight matrix WEIGHT of FIG. 2.

Figure 4:
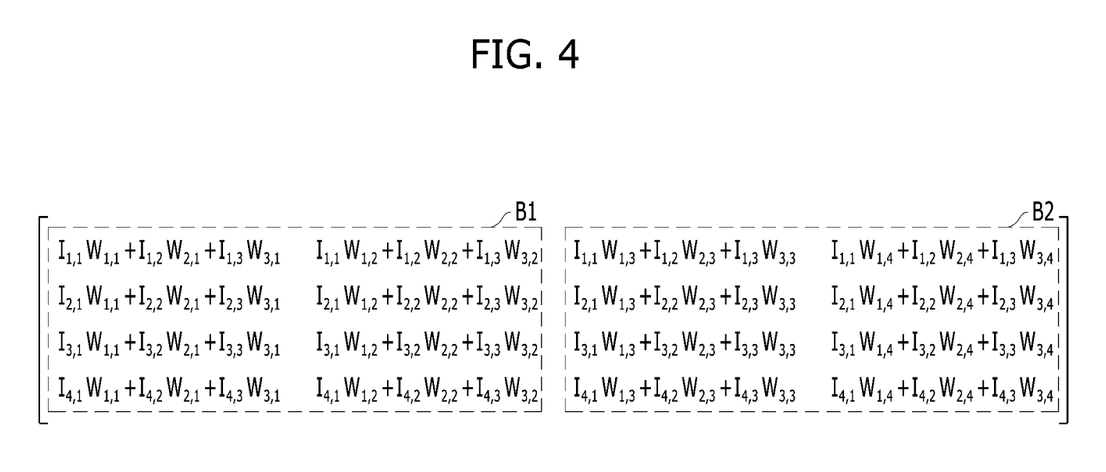
FIG. 4 shows operation results of performing the matrix multiplication operation of FIG. 2 using the systolic array of FIG. 3.

In the operation described in FIGS. 2 to 4, all the PEs PE11, PE12, PE21, PE22, PE31, PE32, PE41, and PE42 of the systolic array 300 are used. In this case, the utilization of the systolic array 300 may be 100%.

Figure 5:
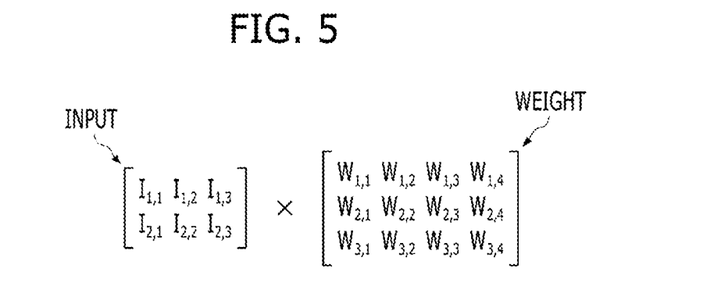
FIG. 5 shows another illustrative matrix multiplication operation that may be performed using a systolic array.

An example will be considered in which a matrix multiplication operation for multiplying an input data matrix INPUT of a 2×3 array and a weight matrix WEIGHT of a 3×4 array, such as the operation shown in FIG. 5, is performed. FIG. 5 illustrates that the input data matrix INPUT is configured with two batches.

Figure 6:
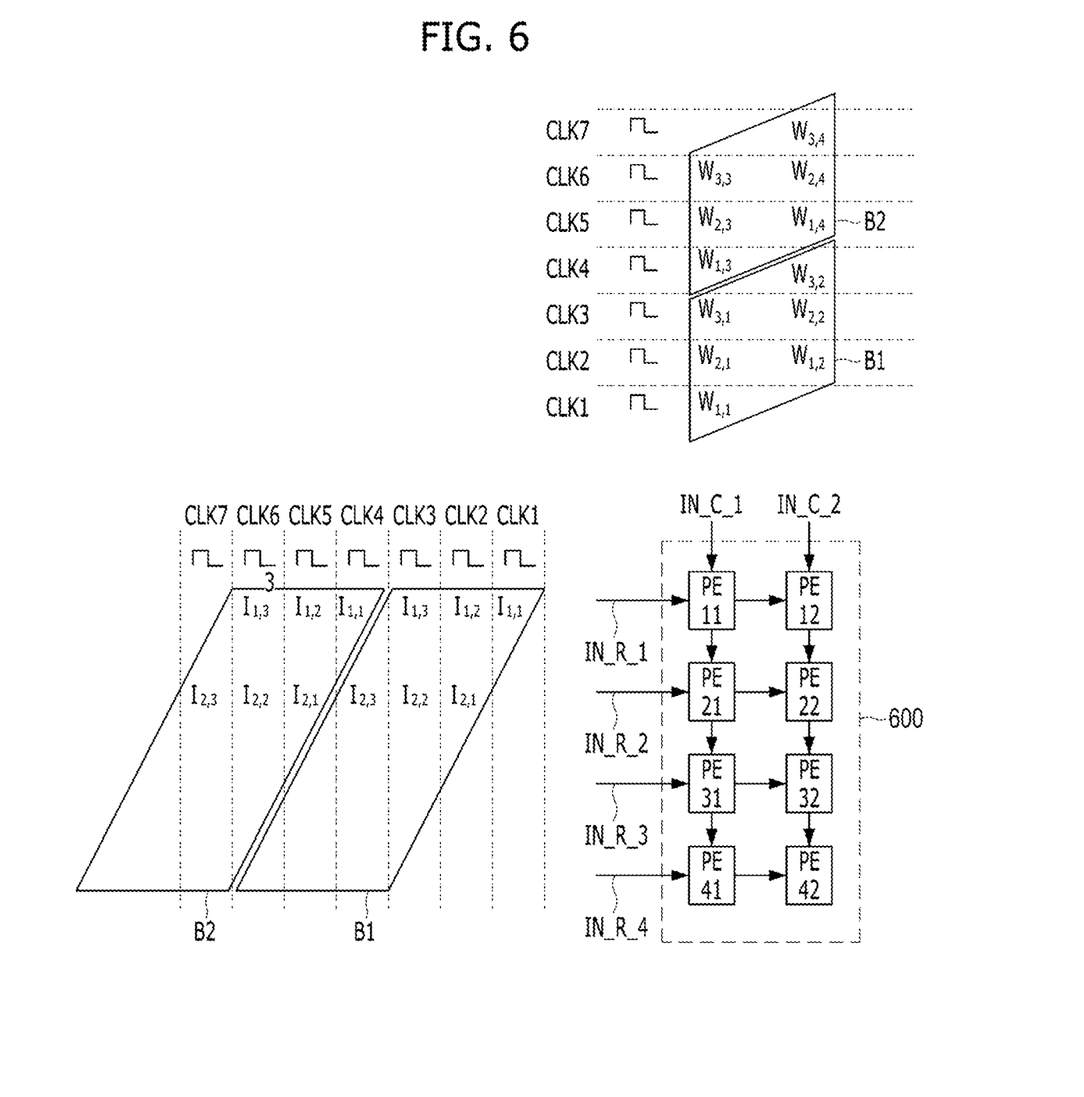
FIG. 6 illustrates how an input data matrix and a weight matrix may be input to a systolic array when the matrix multiplication operation of FIG. 5 is performed using a 4×2 systolic array.

FIG. 6 is a diagram illustrating how an input data matrix INPUT and a weight matrix WEIGHT may be input to a 4×2 systolic array 600 to perform the matrix multiplication operation of FIG. 5. As in FIG. 3, in FIG. 6, CLK1, CLK2, etc. may indicate an input cycle, and B1 or B2 may indicate the boundary of operation. If operation results are output from the systolic array 600 in the boundary unit B1 or B2 of FIG. 6, result values, such as FIG. 7, may be derived. It can be seen that FIG. 7 illustrates the matrix multiplication results of the input data matrix INPUT and weight matrix WEIGHT of FIG. 5.

Figure 7:
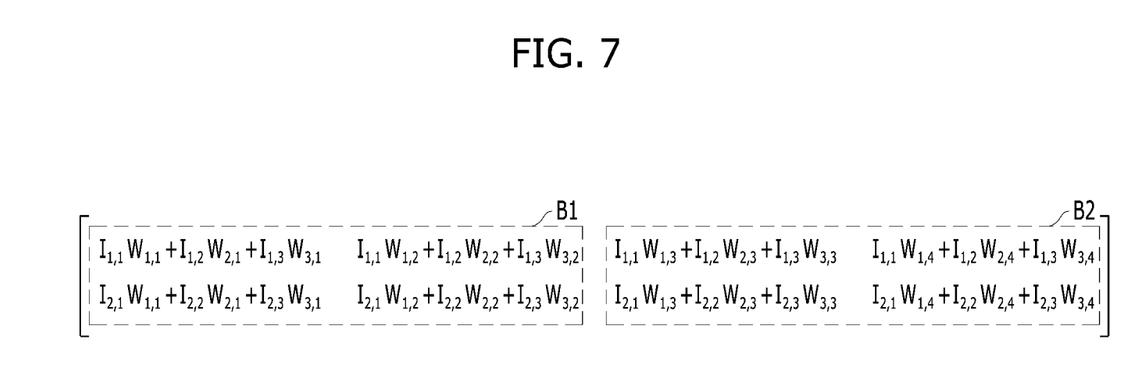
FIG. 7 shows operation results of performing the matrix multiplication operation of FIG. 5 using the systolic array of FIG. 6.

In the operation described in FIGS. 5 to 7, only the PEs PE11, PE12, PE21, and PE22 within the systolic array 600 are used to perform calculations, and the PEs PE31, PE32, PE41, and PE42 are not used to perform calculations. In this case, the utilization of the systolic array 600 is 50%. If the utilization of the systolic array 600 is 50%, this may mean that performance of the systolic array 600 is reduced by 50% compared to maximum performance and an unnecessary current is used.

Figure 8:
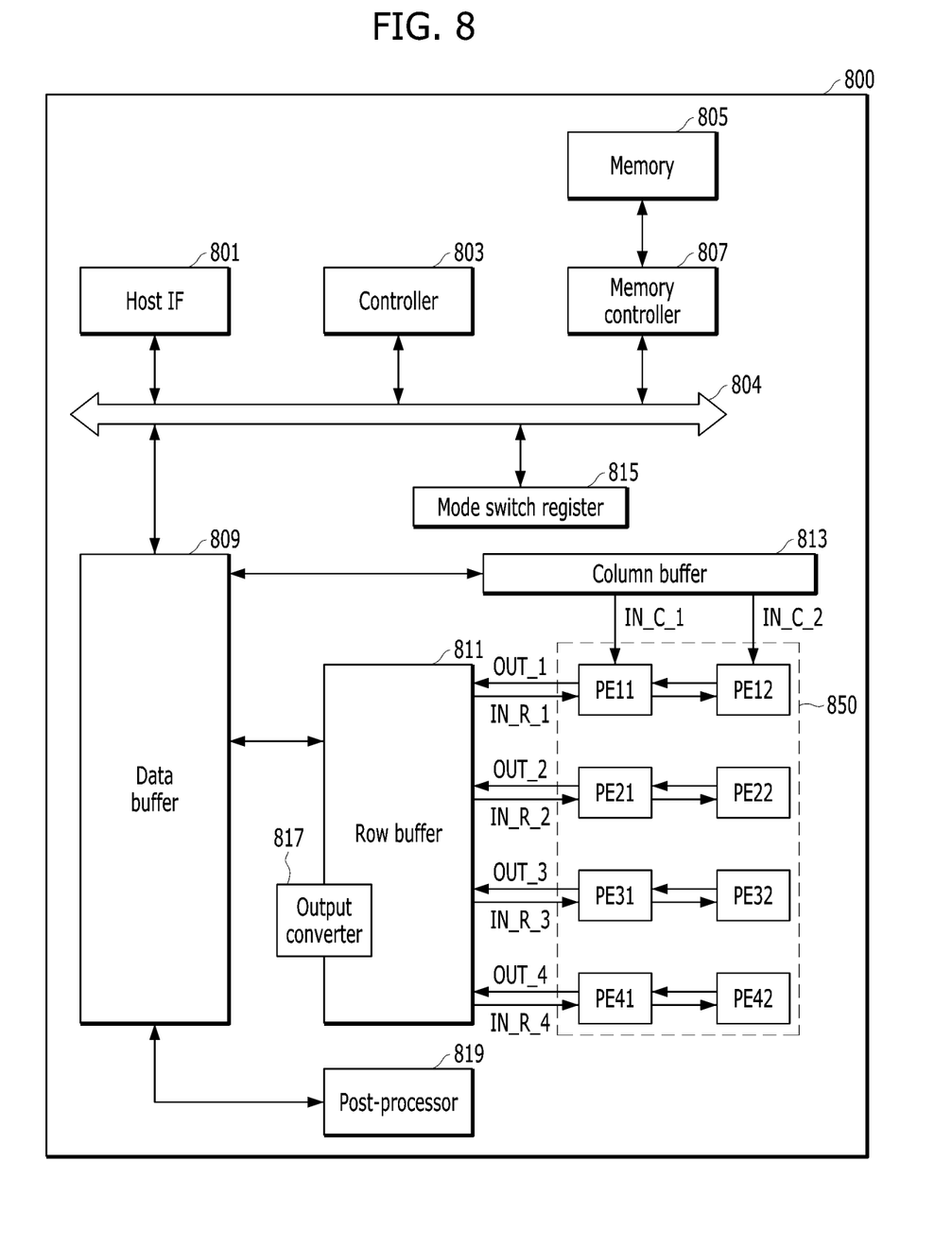
FIG. 8 illustrates a processing system 800 according to an embodiment.

FIG. 8 illustrates a processing system 800 according to an embodiment.

The processing system 800 includes a systolic array 850, a host interface (IF) 801, a controller 803, a memory 805, a memory controller 807, a data buffer 809, a row buffer 811, a column buffer 813, a mode switch register 815, an output converter 817 and a post-processor 819. In this case, the processing system 800 may have various forms, such as a card type in which the processing system is inserted into a PCI express slot, a system on chip (SoC) in which several elements are integrated within a single chip and a system in package (SiP) in which various chips are integrated within a single package.

The host IF 801 may be an interface for communication with a host. Various commands and data to be processed by the processing system 800 may be transmitted from a host, for example, a central processing unit (CPU) through the host IF 801.

The controller 803 may control an overall operation of the processing system 800 in response to an instruction from a host so that the processing system 800 can perform various types of operations. A bus 804 may be a bus that enables elements within the processing system 800 to exchange various signals and data.

The memory 805 may be a memory used by the processing system 800. The memory 805 may store data related to an operation that needs to be performed by the systolic array 850, for example, input data and weights. The memory controller 807 may be used to access the memory 805.

The mode switch register 815 may be a register for setting one of a first mode and a second mode. The processing system 800 may operate in one of the first mode and the second mode based on a setting value stored in the mode switch register 815. The mode switch register 815 may be set by an instruction from a host, which instruction may be received through the host IF 801. The host may set a mode of the mode switch register 815 as the first mode based on a determination that an operation may be more efficiently performed in the first mode than in the second mode, and may set the mode of the mode switch register 815 as the second mode based on a determination that an operation may be more efficiently performed in the second mode than in the first mode.

The data buffer 809 may store data, that is, input data and weights, received from the memory 805 through the memory controller 807. The data buffer 809 may load data onto the row buffer 811 and the column buffer 813. In the first mode, the data buffer 809 may load input data into the row buffer 811 and load weights into the column buffer 813. In the second mode, contrary to the first mode, the data buffer 809 may load weights into the row buffer 811 and load input data into the column buffer 813.

The row buffer 811 may transmit row data to the row inputs IN_R_1, IN_R_2, IN_R_3, and IN_R_4 of the systolic array 850. In the first mode, row data may be input data because the data buffer 809 loads input data onto the row buffer 811 in the first mode. In the second mode, row data may be weights because the data buffer 809 loads weights onto the row buffer 811 in the second mode. The row buffer 811 may be used to transmit operation data, transmitted from the outputs OUT_1, OUT_2, OUT_3, and OUT_4 of the systolic array 850, to the data buffer 809.

The column buffer 813 may transmit column data to the column inputs IN_C_1 and IN_C_2 of the systolic array 850. In the first mode, column data may be weights because the data buffer 809 loads weights onto the column buffer 813 in the first mode. In the second mode, column data may be input data because the data buffer 809 loads input data onto the column buffer 813 in the second mode.

The output converter 817 may convert the type of operation results, output by the systolic array 850 in the second mode, into a same type as in the first mode. In the second mode, the direction of input data and weights input to the systolic array 850 is changed. Accordingly, in the first mode and the second mode, the types of operation results output from the systolic array 850 (for example, the ordering of values within the result) may be different. The output converter 817 may convert the type of operation results, output from the systolic array 850 in the second mode, into the same type as in the first mode. In this case, the first mode has been set as a reference. If the second mode is set as a reference, the output converter 817 may convert the type of operation results, output from the systolic array 850 in the first mode, into the same type as in the second mode. The conversion operation of the output converter 817 will be described specifically later with reference to FIG. 11.

The post-processor 819 may post-process the operation results of the systolic array 850. The post-processor 819 may perform functions, such as pooling for searching for an average or a maximum value for each pixel, a rectified linear activation unit (ReLU) function for filtering data based on a threshold, and normalization for filtering a value out of an activation function such as sigmoid, to produce a result value.

The systolic array 850 may include PEs PE11, PE12, PE21, PE22, PE31, PE32, PE41, and PE42 (illustrated as a 4×2 array) in which the number of rows is different from the number of columns. In the first mode, the systolic array 850 may receive input data through the row inputs IN_R_1 to IN_R_4, receive weights through the column inputs IN_C_1, IN_C_2, and perform an operation on the received input data and weights. In the second mode, the systolic array 850 may receive weights through the row inputs IN_R_1 to IN_R_4, receive input data through the column inputs IN_C_1, IN_C_2, and perform an operation on the received weights and input data. Accordingly, the first mode may be advantageous or the second mode may be advantageous depending on the type of operation performed by the systolic array 850. In the above embodiment, the array of rows and columns have been illustrated as having a 4×2 array in the systolic array 850, but embodiments are not limited thereto, and the array of rows and columns may be different from the 4×2 array.

In the processing system 800 of FIG. 8, if a matrix multiplication operation for multiplying an input data matrix INPUT of a 4×3 array and a weight matrix WEIGHT of a 3×4 array, such as FIG. 2, is performed, the utilization of the systolic array 850 can be maintained at 100% by setting the processing system 800 as the first mode and inputting an input data matrix and a weight matrix to the systolic array 850 as in FIG. 3.

In the processing system 800 of FIG. 8, if a matrix multiplication operation for multiplying an input data matrix INPUT of a 2×3 array and a weight matrix WEIGHT of a 3×4 array, such as FIG. 5, is performed, the utilization of the systolic array 850 will become 50% as described with reference to FIGS. 5 to 7 if the operation is performed by the processing system 800 in the first mode. In this case, it may be advantageous to set the mode of the systolic array 850 as the second mode.

Figure 9:
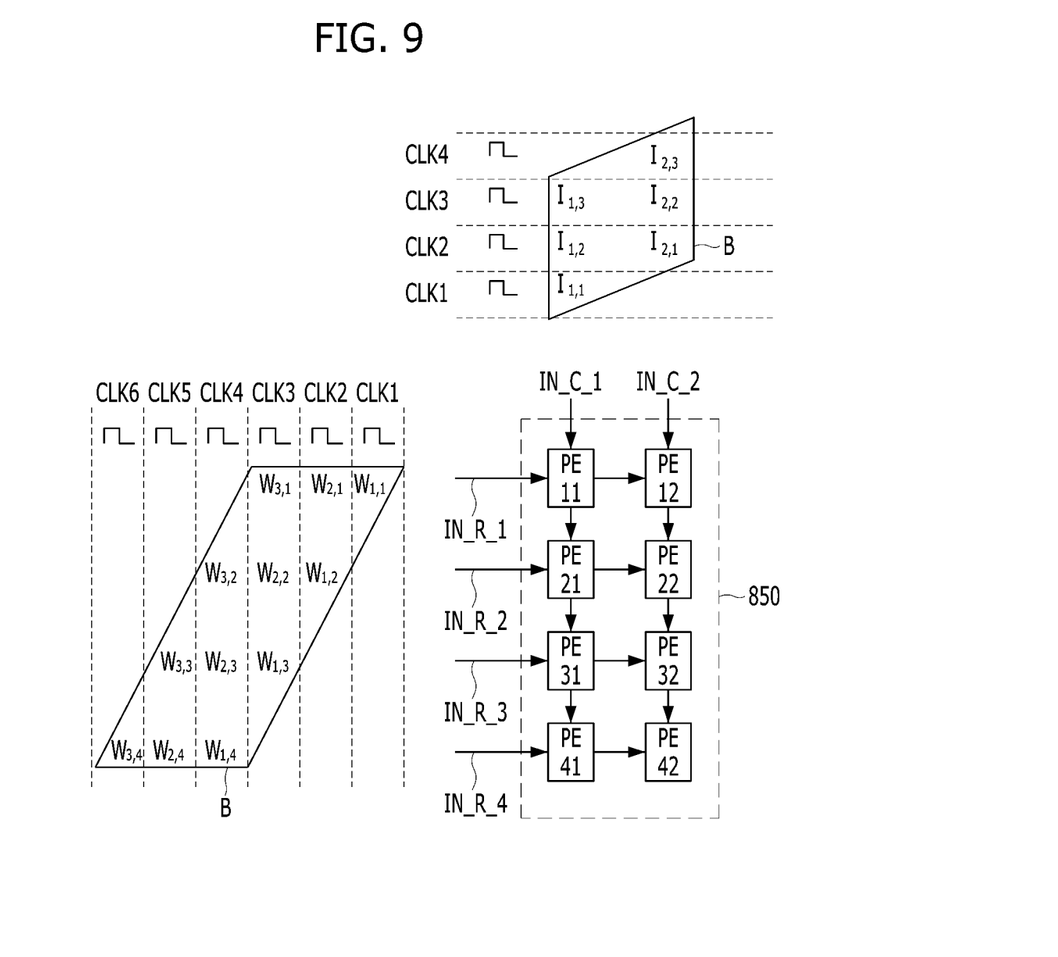
FIG. 9 illustrates how an input data matrix and a weight matrix may be input to the systolic array of FIG. 8 when a matrix multiplication operation for multiplying a 2×3 input data matrix and a 3×4 weight matrix, such as the operation shown in FIG. 5, is performed using a second mode of the processing system of FIG. 8.

FIG. 9 is a diagram illustrating how an input data matrix and a weight matrix may be input to the systolic array 850 when a matrix multiplication operation for multiplying an input data matrix INPUT of a 2×3 array and a weight matrix WEIGHT of a 3×4 array, such as shown in FIG. 5, is performed when the mode of the processing system 800 is set as the second mode. As in FIG. 6, in FIG. 9, CLK1, CLK2, etc. may indicate an input cycle, and B may indicate the boundary of operation. From FIG. 9, it can be seen that in the second mode, the operation of FIG. 5 may be performed based on a single boundary B. If operation results are output from the systolic array 850 in the boundary unit B of FIG. 9, result values, such as FIG. 10, may be derived.

Figure 10:
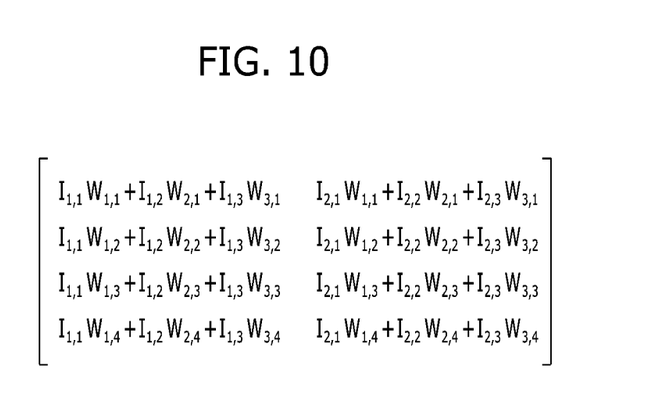
FIG. 10 shows operation results of performing the matrix multiplication operation of FIG. 5 using the systolic array of FIG. 8.
Figure 11:
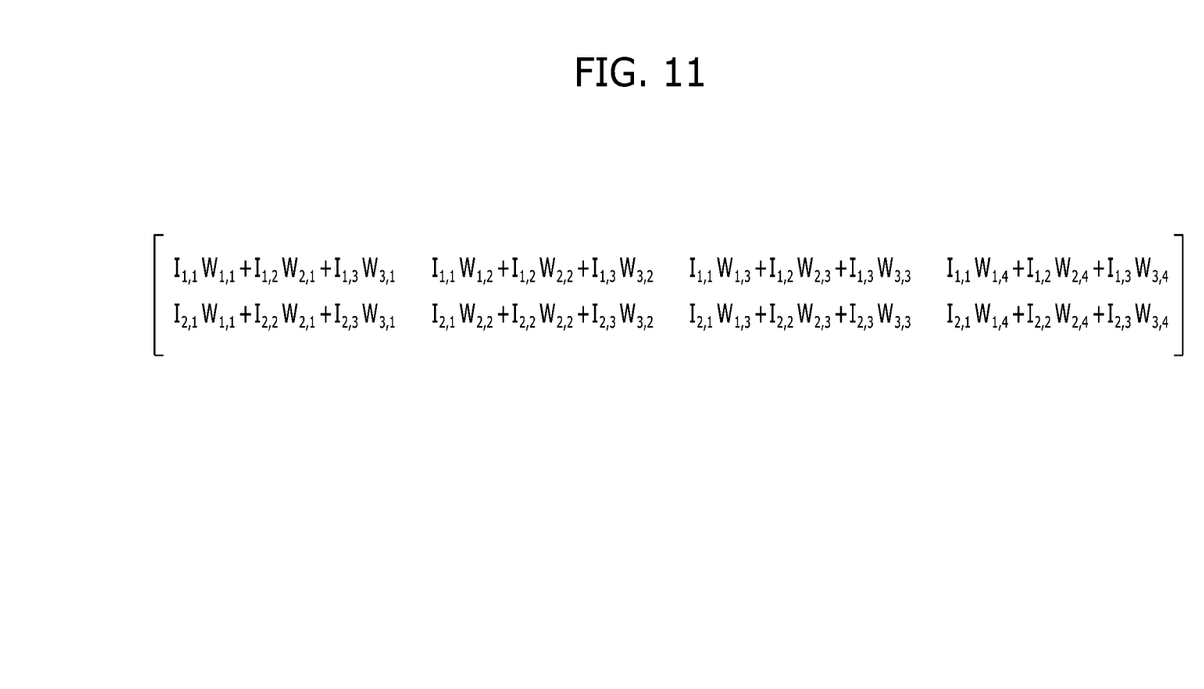
FIG. 11 shows operation results of performing the matrix multiplication operation of FIG. 5 using the systolic array of FIG. 8 after being converted by an output converter.

From FIG. 10, it can be seen that rows and columns in the matrix multiplication results of the input data matrix INPUT and weight matrix WEIGHT of FIG. 5 have been changed relative to the results shown in FIG. 7; in particular, the results shown in FIG. 10 are a transpose of the results shown in FIG. 7, wherein the result at row X and column Y in FIG. 10 is at row Y and column Y of FIG. 7, for X in 1 . . . 4 and Y in 1 . . . 2. The output converter 817 may convert the type of result values of FIG. 10 into the type of result values of FIG. 11. The output converter 817 may perform the conversion operation by simply changing the rows and columns in the result values of FIG. 10. For example, the output converter 817 may change a value at a location 12 into a value at a location 21, may change a value at a location 23 into a value at a location 32, and may not change a value at a location 11. FIG. 11 is the same as FIG. 7. It can be seen that FIG. 11 illustrates the matrix multiplication results of the input data matrix INPUT and weight matrix WEIGHT of FIG. 5.

Referring to FIGS. 9 to 11, all the PEs PE11, PE12, PE21, PE22, PE31, PE32, PE41, and PE42 within the systolic array can be used to perform the matrix multiplication of FIG. 5 by driving the processing system 800 in the second mode. That is, it can be seen that utilization can be increased to 100% and the time taken for an operation can be reduced.

As described above, the utilization of a systolic array can be improved and the waste of an unnecessary time and an unnecessary current can be prevented by driving the processing system 800 in one of the first mode and the second mode depending on the type of matrix operation to be performed by the processing system 800.

According to various embodiments, the utilization of a systolic array can be increased.

Although various embodiments have been described for illustrative purposes, it will be apparent to those skilled in the art that various changes and modifications may be made without departing from the spirit and scope of the invention as defined in the following claims.

What is claimed is:

1. A processing system comprising:
a systolic array comprising a plurality of processing elements (PEs) arrayed in M rows and N columns, wherein M and N are natural numbers and M is not equal to N;
a row buffer configured to transmit row data to the systolic array in a row direction, wherein the row data is input data in response to the processing system being in a first mode when performing an operation and the row data is weights in response to the processing system being in a second mode when performing the operation; and
a column buffer configured to transmit column data to the systolic array in a column direction, wherein the column data is the weights in response to the processing system being in the first mode when performing the operation and the column data is the input data in response to the processing system being in the second mode when performing the operation.

2. The processing system of claim 1, further comprising a data buffer configured to load the input data into the row buffer and load the weights into the column buffer in response to the processing system being in the first mode when performing the operation, and to load the weights into the row buffer and load the input data into the column buffer in response to the processing system being in the second mode when performing the operation.

3. The processing system of claim 1, further comprising an output converter configured to convert a type of operation results output from the systolic array in response to the processing system being in the second mode when performing the operation into a type identical with a type output from the systolic array in response to the processing system being in the first mode when performing the operation.

4. The processing system of claim 1, further comprising an output converter configured to convert a type of operation results output from the systolic array in response to the processing system being in the first mode when performing the operation, into a type identical with a type output from the systolic array in response to the processing system being in the second mode when performing the operation.

5. The processing system of claim 1, wherein a PE of the plurality of PEs comprises:
a multiplier configured to multiply the row data by the column data;
a first register configured to store a result value; and
an adder configured to perform an addition operation on a result of the multiplication performed by the multiplier and a value stored in the first register and to store a result of the addition operation in the first register as the result value.

6. The processing system of claim 5, wherein the PE of the plurality of PEs further comprises:
a second register configured to transmit the column data to a PE of a next row; and
a third register configured to transmit the row data to a PE of a next column.

7. The processing system of claim 6, wherein the PE of the plurality of PEs further comprises:
a multiplexer configured to select one of a result value transmitted from the next column and the result value stored in the first register; and
a fourth register configured to store an output value of the multiplexer and transmit the output value to a previous column.

8. The processing system of claim 1, further comprising:
a host interface configured to communicate with a host;
a memory configured to store data;
a memory controller configured to access the data of the memory and to load the data into a data buffer,
a controller configured to control the processing system according to instructions from the host transmitted through the host interface;
a mode switch register configured to set the first mode and the second mode; and
a post-processor configured to post-process results of operations performed by the systolic array.

9. The processing system of claim 1, wherein the input data comprises image data.

10. A systolic array, comprising:
M row inputs configured to transmit input data as row data in response to a first mode being set when performing an operation and to transmit weights as the row data in response to a second mode being set when performing the operation, wherein M is a natural number;

N column inputs configured to transmit the weights as column data in response to the first mode being set when performing the operation and to transmit the input data as the column data in response to the second mode being set when performing the operation, wherein N is a natural number and N is not equal to M; and M*N processing elements (PEs) each configured to perform a multiplication operation on row data transmitted to a row input corresponding to the PE among the M row inputs and column data transmitted to a column input corresponding to the PE among the N column inputs, and to sum a result of the multiplication operation and a result of a previous operation.

11. The systolic array of claim 10, wherein a PE of the M*N PEs comprises:

a multiplier configured to multiply the row data transmitted to the row input corresponding to the PE and the column data transmitted to the column input corresponding to the PE;

a first register configured to store a result value; and an adder configured to perform an addition operation on a result of the multiplication of the multiplier and a value stored in the first register and to store a result of the addition operation in the first register as the result value.

12. The systolic array of claim 11, wherein the PE of the M*N PEs further comprises:

a second register configured to transmit the column data transmitted to the column input corresponding to the PE to a PE of a next row; and a third register configured to transmit the row data transmitted to the row input corresponding to the PE to a PE of a next column.

13. The systolic array of claim 12, wherein the PE of the M*N PEs further comprises:

a multiplexer configured to select one of a result value transmitted from the next column and the result value stored in the first register, and a fourth register configured to store an output value of the multiplexer and to transmit the output value to a previous column.

* * * * *